(12) United States Patent
Rose et al.

(10) Patent No.: US 8,102,760 B2
(45) Date of Patent: Jan. 24, 2012

(54) METHOD FOR RECONVERGENCE AFTER FAILURE IN A DUAL-HOMING NETWORK ENVIRONMENT

(75) Inventors: Laurence Rose, Oak Park, CA (US); Nalinakshan Kunnath, Camarillo, CA (US); Jagjeet S. Bhatia, Newbury Park, CA (US)

(73) Assignee: Alcatel Lucent, Paris (FR)

( * ) Notice: Subject to any disclaimer, the term of this patent is extended or adjusted under 35 U.S.C. 154(b) by 130 days.

(21) Appl. No.: 12/459,349

(22) Filed: Jun. 30, 2009

(65) Prior Publication Data

US 2010/0329110 A1    Dec. 30, 2010

(51) Int. Cl.
*G06F 11/00*    (2006.01)
(52) U.S. Cl. ......................................... 370/217; 709/239
(58) Field of Classification Search .................. 370/423, 370/395.53; 709/239
See application file for complete search history.

(56) References Cited

U.S. PATENT DOCUMENTS

| 2004/0105455 | A1* | 6/2004 | Seaman | 370/423 |
| 2005/0071672 | A1 | 3/2005 | Fung | |
| 2006/0047851 | A1* | 3/2006 | Voit et al. | 709/239 |
| 2009/0274155 | A1* | 11/2009 | Nakash | 370/395.53 |

FOREIGN PATENT DOCUMENTS

| EP | 1511243 A1 | 3/2005 |
| GB | 2448711 A1 | 10/2008 |
| WO | 2007144870 A1 | 12/2007 |

OTHER PUBLICATIONS

IEEE Std 802.1D-2004, 802.1D, IEEE Standard for Local and Metropolitan Area Networks, Media Access Control (MAC) Bridges, Jun. 9, 2004, pp. 137-179.*
PCT/US2010/040163 Notification of Transmittal of the International Search Report and the Written Opinion of the International Searching Authority, or the Declaration dated Oct. 18, 2010.

* cited by examiner

*Primary Examiner* — Albert T Chou
(74) *Attorney, Agent, or Firm* — Stephen Wyse

(57) ABSTRACT

A manner of providing for re-convergence in a dual homing network following the failure of one of the dual homing links. When such a failure is detected, the port roles are recomputed using an xSTP protocol. Prior to the completion of the computation, the operEdge variable is set to true, typically resulting in a more rapid re-convergence that may achieve sub 50 ms performance. When the computation is complete, the operEdge variable is reset to "false. The xSTP protocol may be, for example, RSTP or MSTP. The invention may be implemented in a CE device attached to a VPLS core or other network, and may be used in a LAG environment.

8 Claims, 4 Drawing Sheets

METHOD FOR RECONVERGENCE AFTER FAILURE IN A DUAL-HOMING NETWORK ENVIRONMENT

TECHNICAL FIELD

The present invention relates generally to the field of communication networks, and, more particularly, to a method for improving the speed of re-convergence after the failure of a link in a dual-homing network environment.

BACKGROUND

The following abbreviations are herewith defined, at least some of which are referred to within the following description of the state-of-the-art and the present invention.
BPDU Bridge Protocol Data Unit
CE Customer Edge (device)
IEEE Institute of Electrical and Electronics Engineers
IETF Internet Engineering Task Force
ITU International Telecommunication Union
LACP Link Aggregation Control Protocol
LAG Link Aggregation
LAN Local Area Network
LDP Label Distribution Protocol
MAC Media Access Control
MC-LAG Multi-Chassis Link Aggregation
MPLS Multiprotocol Label Switching
MSTP Multiple Spanning Tree Protocol
PDB Permanent Database
PDU Protocol Data Unit
PE Provider Edge (device)
RFC Request for Comments (an IETF publication) RSTP Rapid Spanning Tree Protocol
STP Spanning Tree Protocol
VLAN Virtual Local Area Network
VPLS Virtual Private LAN Service Computers are often connected together through a communications network that can be used to transmit data from its origin to one or more intended destination. In many such networks, the data is first broken up into discrete segments, often referred to as packets or frames. Individual segments are addresses and sequentially numbered so that they may be reassembled at the destination node. The origin and destination nodes are not usually connected directly to each, so the data must be routed though the various network nodes. A typical network is made up of many nodes, such as bridges or routers, which receive and forward the data packets or frames toward their destination. The network nodes are typically interconnected in such a way that the individual data segments making up a transmission may take more than one route. This form of interconnection aids in providing reliable transmission even when some of the paths or nodes fail as happens from time to time.

One type of computer network is a LAN, which may be implemented by a business or other enterprise to tie together some or all of the computers at a given location. Many LANs also include some type of gateway node to permit communication with entities outside of the LAN itself, for example providing Internet access to LAN users. In some cases a business may have more than one location, each with its own LAN. When this occurs, there is naturally a desire to connect the two (or more) LANs together so that LAN users in each location can communicate with those in other locations. Simply communicating through a widely-accessible network might pose security risks, so enhanced methods have been developed.

Once such method is VPLS, a protocol described in part in RFC 4762, promulgated by the IETF. VPLS creates an emulated Ethernet LAN segment that is accessible to some users but not to others, though a large network that is often referred to as a VPLS core or simply a "cloud" (in reference to the manner is which it is often represented in illustrations). This VPLS network is often owned by a network service provider, who uses it to provide VPLS services to many customers. A customer, such as the business referred to above, may, for example, connect two LANS through the VPLS core. Each LAN and the VPLS core interface with each other at respective customer or provider edge devices.

A single CE device from each LAN may attach to a single proximate PE device, although an attachment scheme known as dual homing has also been developed. In a dual homing topology, two ports on the CE device are allocated to the VPLS interface, with each allocated port being placed into communication with a different PE device. Dual homing provides, among other advantages, a redundant connection to the VPLS or other network that may prove useful if a link failure occurs.

Unfortunately, in this topology loops can occur, where nodes that are used to route data will potentially receive packets or frames that they have already transmitted, and must then attempt again to forward them toward their destination. This creates a large inefficiency, and solutions have been created to prevent loops from happening. One solution is knows as spanning tree protocol, or STP. STP is described in IEEE 802.1 D and related standards. It is currently widely used in its more recent formulations, such as RSTP and MSTP (described in IEEE 802.1w and 802.1s, respectively). The term xSTP is sometimes used to generally refer to all of these variations.

In general, STP prevents loops in a network by establishing one primary pathway between any two network nodes. Communicating through messages known as BPDUs, the network nodes determine a root node and for each spanning tree, compute the pathways, and then block transmissions on other paths. The protocols also allow for the detections of the failure of a primary pathway and calculation of any necessary adjustments. This adjustment is often referred to as re-convergence and generally involves not only calculating the new pathways, but blocking and unblocking the links necessary to put the new spanning tree into effect.

A VPLS network may be expected to have xSTP implemented for loop prevention within the VPLS core. This frequently does not, however, detect loops through the provider network involving the CE device in a dual homing configuration, which means the CE must run its own loop avoidance protocol. Unfortunately, current standards do not guarantee that re-convergence after a failure in the dual homing topology will occur quickly. For example, a desirable re-convergence time for VPLS core nodes is currently below 50 ms, but an instance of xSTP running on a CE attached to the VPLS core may not be able to effect re-convergence in under 3 seconds, and it may perhaps take as long as 30 seconds. This is especially true where, as is frequently the case, the CE device is running one proprietary version of xSTP and the provider nodes are running another.

Accordingly, there has been and still is a need to address the aforementioned shortcomings and other shortcomings associated with re-convergence after failure in a dual homing environment. These needs and other needs are satisfied by the present invention.

SUMMARY

The present invention is directed to the problem of improving re-convergence times after certain failures in a dual homing network. In one aspect, the present invention is a method for re-convergence after failure of a dual homing link including detecting a failure on a first dual homing port of a CE device, computing the role of each dual homing port on the CE device using an xSTP protocol that maintains a value for an operEdge variable, setting the operEdge variable to "true" prior to the completion of the role computation. In some but not all embodiments, the operEdge variable will be set to "true" as soon as the fault has been detected, for example it this operation may wait until it has been confirmed that the non-failed dual homing port is in the backup state. In any case, the method of this embodiment continues with resetting, after completion of the role re-computation, the operEdge variable to "false"

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings wherein.

DETAILED DESCRIPTION

The present invention is directed to the problem of improving re-convergence times after certain failures in a dual homing network. A dual homing network is one in which a customer topology is configured in a dual homing attachment. The invention is especially advantageous when applied to CE devices that are connected using a dual homing attachment to provider networks that are operable according to VPLS or IEEE 802.1ad (provider bridges) protocols. An example is shown in FIG. 1.

Figure 1:
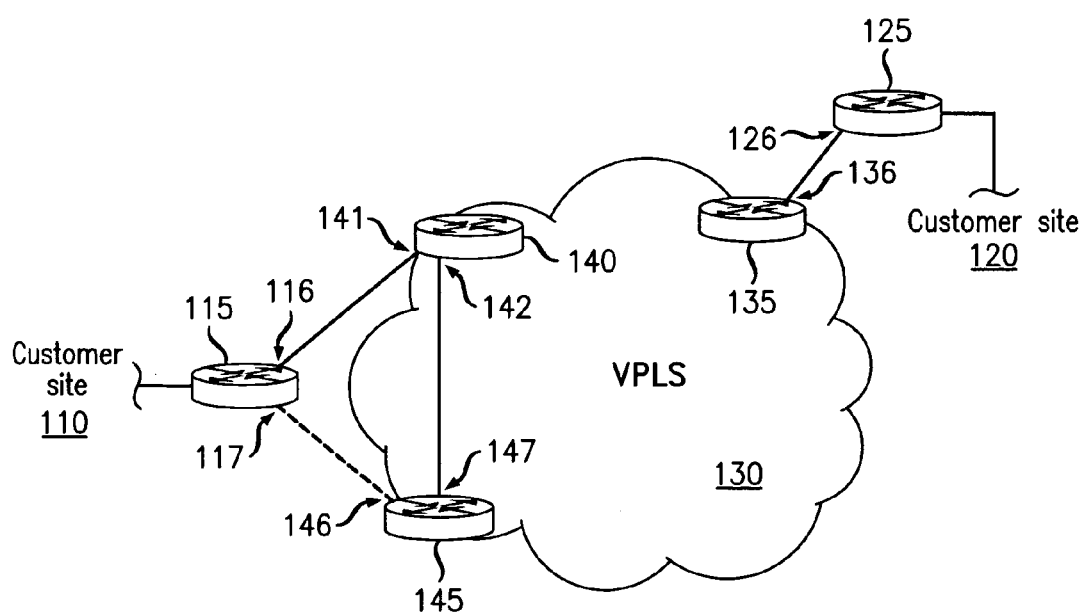
FIG. 1 is a schematic diagram illustrating a network in which an embodiment of the present invention may be implemented.

FIG. 1 is a schematic diagram illustrating a network 100 in which an embodiment of the present invention may be implemented. In this exemplary to configuration, shown are two customer sites, referred to as 110 and 120. Thus configured, customer site 110 communicates with customer site 120 via a VPLS 130. The configuration of customer sites 110 and 120 is not shown except for their respective customer edge devices, CE device 115 and CE device 125. By the same token, most of the (typically many) nodes making up VPLS 130 are also not shown.

In FIG. 1, VPLS 130 is represented by a cloud, with three representative provider edge devices being shown. PE device 135 is directly in communication with a single customer edge device, CE device 125, which is located at customer site 120. Note that as used herein, direct communication implies a direct physical connection, although the presence of intermediate components such as hubs or repeaters is not precluded. In some embodiments, the communication between PE device 135 and CE device 125 may also include a wireless interface. Illustrated here, however, is a direct physical connection from port 126 of CE device 125 to port 136 of PE device 135.

For purposes of illustration, a direct connection is also shown from port 142 of PE device 140 to port 147 of PE device 145. In actuality, each node of VPLS 130 is connected directly or indirectly to every other. For example, there are typically a number of interconnected nodes between PE device 140 and PE device 135, creating several possible data paths. These additional devices and connections are for clarity not shown in FIG. 1.

In the embodiment of FIG. 1, CE 115 of customer site 110 is attached to VPLS 130 in a dual homing configuration. This is accomplished by placing port 116 of CE 115 into direct communication with port 141 of PE 140, and placing port 117 of CE 110 into direct communication with port 146 of PE 145. In this way, CE 115 has been placed into direct connection with both PE 140 and PE 145 of VPLS 130, through which CE 115 can communicate with CE 125, linking customer sites 110 and 120. In accordance with an embodiment of the present invention, one of these links may be assigned as active at a particular time, with the other link being designated as inactive. The inactive link is represented by a broken line extending from port 117 of CE device 115 to port 146 of PE device 145.

Note that CE 125 could also be attached to VPLS 130 in similar fashion but is not in this embodiment. This does not affect the implementation of the present invention with respect to CE 115. Note also, however, that the network topology should not allow for the creation of loops between a dual homing customer site implementing the present invention and other customer sites.

A loop involving CE 115, PE 140, and PE 145 may form, as each device can send or receive packets to or from either of the others on two different ports. For this reason xSTP may be employed in order to insure that no actual loops occur. In accordance with this embodiment of the present invention, xSTP is running solely on the customer edge device, in this case CE 115.

In the embodiment of FIG. 1, the first line of communication between port 116 and port 141 is presently operating as an active link, and the second line of communication between port 117 and port 146 is inactive, that is, in a standby mode as illustrated by the broken line. This configuration may be altered if a failure occurs in the (currently) active link of the first line of communication.

Figure 2:
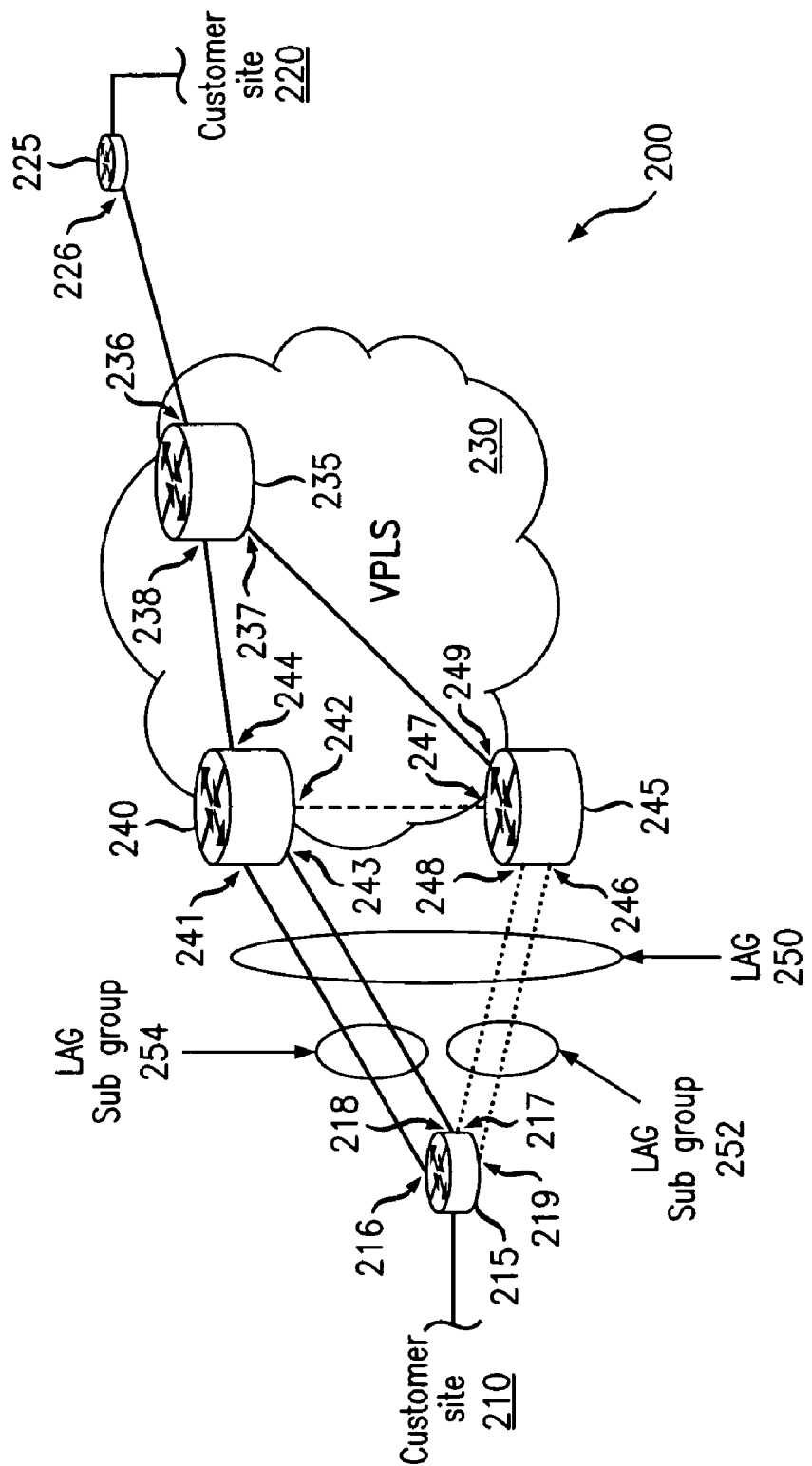
FIG. 2 is a schematic diagram illustrating a network in which an embodiment of the present invention may be implemented.

The present invention may also be implemented in an aggregation environment, as illustrated in reference to FIG. 2. FIG. 2 is a schematic diagram illustrating a network 200 in which an embodiment of the present invention may be implemented. In this exemplary configuration, shown are two customer sites, referred to as 210 and 220. Thus configured, customer site 210 communicates with customer site 220 via a VPLS core 230. In a preferred embodiment, the dual homing network including VPLS 230 is operated according to an MC-LAG protocol. The configuration of customer sites 210 and 220 is not shown except for their respective customer edge devices, CE device 215 and CE device 225. By the same token, most of the (typically many) nodes making up VPLS 230 are also not shown.

As with FIG. 1, in FIG. 2 the VPLS 230 is represented by a cloud, with three representative provider edge devices being shown. In the embodiment of FIG. 2, a direct communication between port 226 of CE device 225 and port 236 of PE device 235 is shown. Here is should be noted while there are many similarities between network 200 of FIG. 2 and network 100 of FIG. 1, and similar components are analogously numbered, there is intended no implication that the two networks are identical except where so illustrated, or that the similar components must be present in all embodiments of the present invention. In FIG. 2, each of the VPLS edge nodes are shown to be in direct communication with each other; PE devices 235 and 240 via their respective ports 244 and 238, PE devices 235 and 245 via their respective ports 237 and 249, and PE devices 240 and 245 via their respective ports 242 and 247. This illustrated configuration is for simplicity of illustration only, and typically there are numerous other nodes (such as switches, bridges, or routers) between each of these devices.

In the embodiment of FIG. 2, CE device 215 at customer site 210 is attached to the VPLS 230 in a dual homing configuration using a LAG 250. LAG 250 consists of two LAG sub groups, 252 and 254. In accordance with the present invention, there should be no more than two such sub groups, that is, a CE device should be attached no more than two PE devices. In this embodiment, LAG sub group 252 includes a first direct communication between port 217 of CE device 215 and port 248 and PE device 245, and a second direct communication between port 219 of CE device 215 and port 246 of PE device 245. Similarly, LAG sub group 254 includes a first direct communication between port 216 of CE device 215 and port 241 and PE device 240, and a second direct communication between port 218 of CE device 215 and port 243 of PE device 240. In each case the first and second communication lines operate in aggregated fashion to facilitate the dual homing functionality.

It should be noted here, however, that it is not necessary that both links in the dual homing attachment are either aggregated or not aggregated, meaning that a dual homing environment could be created as a hybrid of network 100 of FIG. 1 and network 200 of FIG. 2.

In the embodiment of FIG. 2, the LAG sub group 254 is presently operating as an active link, and LAG group 252 is inactive, that is, in a standby mode as illustrated by the broken lines. This configuration may be altered if a failure occurs in the (currently) active link of sub group 254. A method of responding to the failure of an active dual home link, applicable to either network 100 of FIG. 1 or network 200 of FIG. 2, will now be described.

Figure 3:
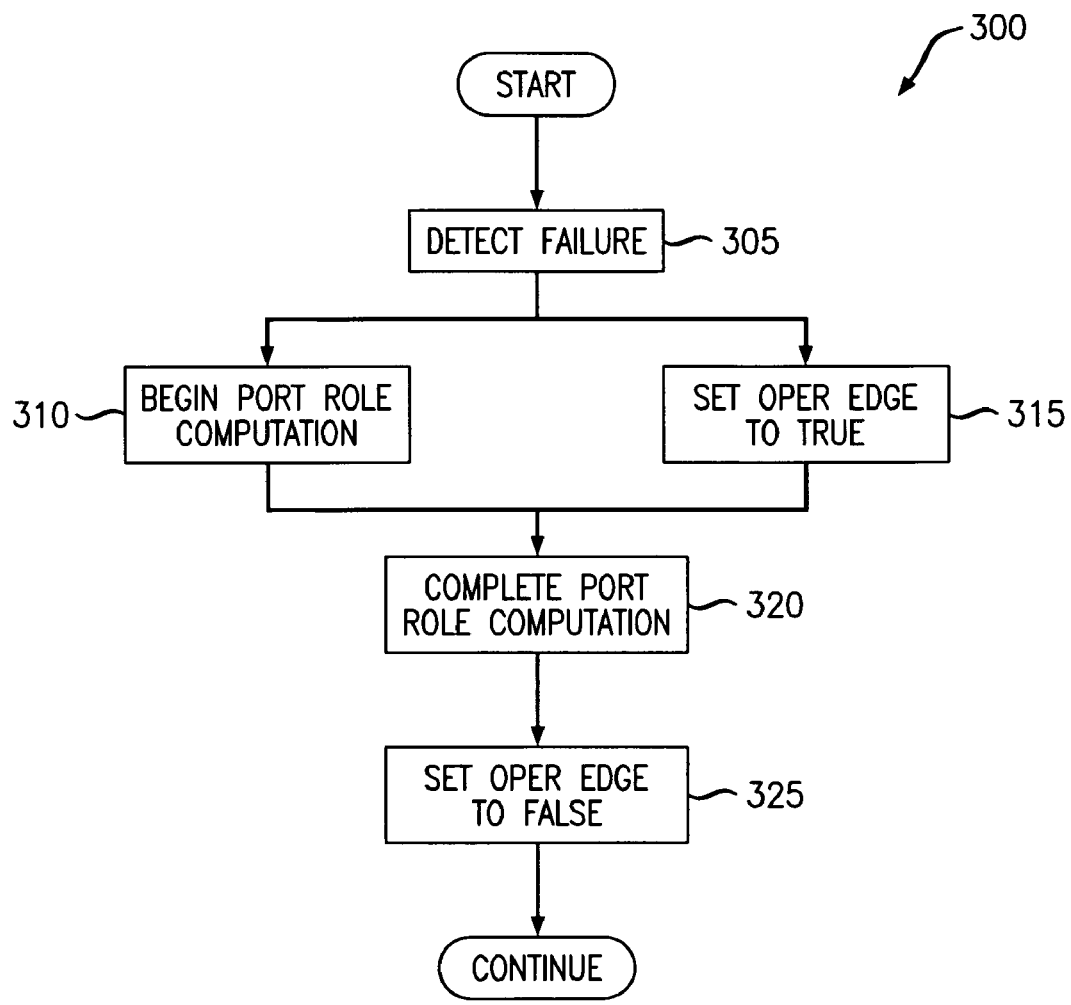
FIG. 3 is a flow diagram illustrating a method according to an embodiment of the present invention.

FIG. 3 is a flow diagram illustrating a method 300 according to an embodiment of the present invention. At START it is assumed that the hardware and software necessary for implementing this embodiment of the present invention is available and operational. The method then begins when a failure is detected (step 305) on one of the dual homing ports of a CE device. When such a failure is detected, a computation of the roles of each port is initiated (step 310).

According to this embodiment of the present invention, this computation is performed by an instance of xSTP running on the CE device; the attached PE devices should not run xSTP upon failure of a dual homing link. Prior to completion of the computation (at step 320), the xSTP operEdge variable is set to "true" (step 315). Note that setting the operEdge variable to true must be done in time to influence the state machine and enforce re-convergence; this event therefore delineates the separate steps 310 and 320. When the computation is complete (step 320), operEdge is reset (step 325) to "false". The process then continues with normal operation until another failure or change in configuration occurs.

In this manner the method 300 allows an immediate state transition in response to the detected link failure, and avoids the extended procedures used to achieve substantially the same result.

Figure 4:
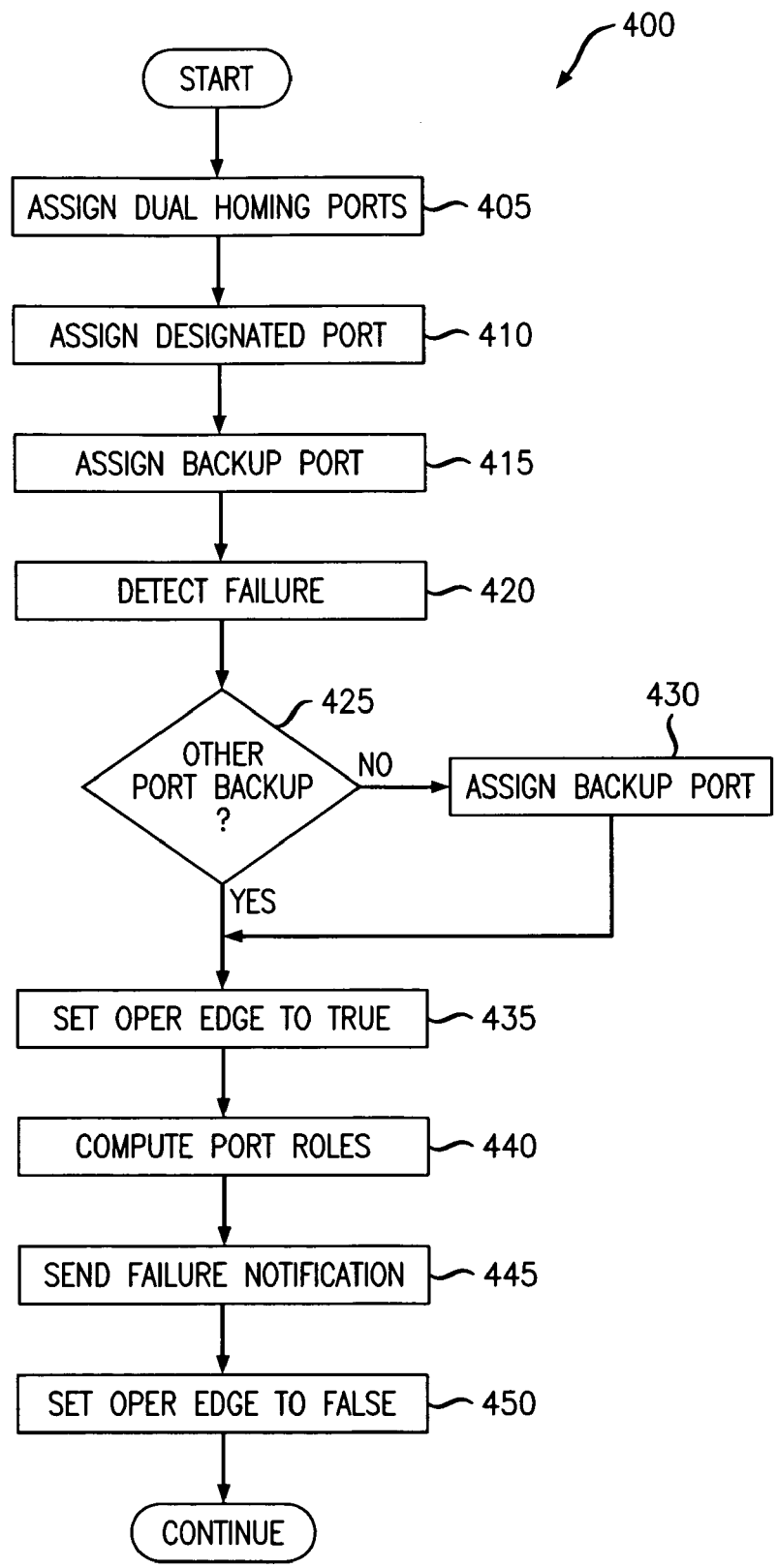
FIG. 4 is a flow diagram illustrating a method according to an embodiment of the present invention.

FIG. 4 is a flow diagram illustrating a method 400 according to an embodiment of the present invention. In this more detailed embodiment, the process is generally compatible with but not necessarily the same as in the embodiment of FIG. 3. In the embodiment of FIG. 4, at START it is again assumed that the hardware and software necessary for implementing this embodiment of the present invention is available and operational. The process then begins with assigning (step 405) two ports on a CE device as dual homing ports, creating the deal homing attachment topology as shown, for example, in FIG. 1 and described above. In a preferred embodiment, the dual homing port assignation is accomplished by generating an administrative command.

As pointed out above, link aggregation may also be used to create the dual homing network topology. In this case, the assigned dual homing ports may each have a number of physical links as part of each LAG subgroup. Preferably, however, the entire LAG should connect to no more than two bridges (see, for example, FIG. 2). The LAG subgroups then form virtual ports for the dual homing topology.

In the embodiment of FIG. 4, one of the two dual homing ports is then assigned a DesignatedPort role and is placed in a forwarding state (step 410); the other dual homing port is preferably assigned a BackupPort role and placed in a blocking state (step 415) at this time. Alternately, the other dual homing port could be assigned an AlternatePort role (step not shown). Once configured, the dual homing network is operated in this configuration until reconfiguration is desired or necessary, as in the event of a failure.

Note that in accordance with one embodiment of the present invention, selective BPDU flooding (not shown) is used to, among other things, ensure that there are no other loops using any of the dual homing links except the one arising from the dual homing attachment itself. Here it is presumed that no BDPUs will be received on a dual homing link other than the one sent by the dual homing CE to itself This will be true as even where the provider network uses xSTP, it should be turned off on dual homing ports so as not to interact with the customer CE. Preferably, the customer floods its own BPDUs from some device other than the CE, and does so on a selective basis. BPDUs are sent only where it is useful to break up a loop. (No BPDU needs to be sent to the PE device 135 shown in FIG. 1, for example, nor does any BPDU need to be received from customer site 120.) Rather, BPDUs can be configured for a single destination PE device, and they are then unicast or filtered by the destination PE device as appropriate. The present invention is for this reason advantageously employed in situations where customer xSTP frames are flooded across the provider network as if they were ordinary user traffic.

Returning to the embodiment of FIG. 4, a failure may occur, for example, because a PE device has failed or become overloaded, or the link between the CE device and the respective PE device may be broken. Whatever the cause of the failure, however, in this embodiment, when a failure is detected (step 420) at the Designated Port, an assessment is made of the other dual homing port on the CE device to determine (step 425) if the other port is in the role of a BackupPort and a blocking state. If not, this role and state are assigned (step 430). Note that although this may seem redundant of step 415, in a preferred embodiment is performed at this stage to ensure that the previous assignment was successfully made and is still in effect.

In an alternate embodiment (not shown), it may be determined in addition to or instead of the determination at step 425), whether the other port is assigned as an Alternate_Port. If so, in this alternate embodiment, such an assignation may also be made at this time, depending usually on a predetermined preference.

Returning to the embodiment of FIG. 4, once the role and state are properly assigned, the value of the operEdge variable is set to true (step 435) and a re-computation of the port roles is executed (step 440). In a preferred embodiment of the present invention, the computation will be performed according to the RSTP or MSTP protocol using the updtRolesTree function. In other embodiments, however, it may be some other form of STP or a similar protocol (all generally referred to herein as xSTP). "Similar protocol" is intended to refer to any protocol similar in function (as is relevant to implementation of the present invention) regardless of what it is called. By the same token, "operEdge variable" and "updtRolesTree function" are intended to refer to similar (as is relevant to implementation of the present invention) variables or functions regardless of what they are labeled.

Note that the value of the operEdge can be set at any time logically-consistent with its role in the implementation of the present invention. Specifically, in normal xSTP operation, the other port (the one other than the port associated with the detected failure) transitions from the BackupPort role and the blocking state to the DesignatedPort role and the "forwarding state" by transmitting a proposal or proposals. In accordance with this embodiment of the present invention, however, the previous setting of the operEdge variable to true provokes a immediate transition to the DesignatedPort role and the "forwarding state", saving a great deal of convergence time.

In a preferred embodiment, a notification of the failure is then generated and transmitted (step 445) to a network operator so that appropriate action can be taken. When the computation at step 440 has been executed, the operEdge value is reset to false (step 450) for normal operation. Operation then continues until the network is reconfigured or another failure occurs.

Note that the methods 300 and 400 described above are intended to be exemplary and not limiting. In other embodiments, some of the operations may be performed in a different order; any logically-consistent sequence is permitted unless a particular sequence is specifically required in a particular claim. In other embodiments, operations may be added, or in some cases subtracted, without departing from the spirit of the invention.

In this manner, the present invention provides a process for loop avoidance in a dual homing environment that is expected to yield far faster re-convergence in the event of a dual homing link failure than is otherwise achievable using current protocols. In some implementations, achieving sub 50 ms re-convergence is anticipated.

Although multiple embodiments of the present invention have been illustrated in the accompanying Drawings and described in the foregoing Detailed Description, it should be understood that the present invention is not limited to the disclosed embodiments, but is capable of numerous rearrangements, modifications and substitutions without departing from the invention as set forth and defined by the following claims.

The invention claimed is:

1. A method for re-convergence after failure of a dual homing link, comprising:
   detecting a failure on a first dual homing port on a CE device;
   determining whether a port on the CE device is in the role of a BackupPort and in a blocking state;
   designating the second port on the CE device as a BackupPort and assigning a blocking state if it is determined that the second dual homing port is not a BackupPort in a blocking state;
   setting an operEdge variable to "true" upon one of determining that the second port is a BackupPort in a blocking state or assigning a blocking state to the second port;
   re-computing the role of each dual homing port on the CE device using an xSTP that maintains a value for the operEdge variable; and
   resetting, after completion of the role re-computation, the operEdge variable to "false".

2. The method of claim 1, further comprising confirming that the second dual homing port is in a blocking state.

3. The method of claim 1, wherein the re-computation is performed according to the RSTP.

4. The method of claim 1, wherein the re-computation is performed according to the MSTP.

5. The method of claim 1, wherein the re-computation is performed using the xSTP function updtRolesTree( ).

6. The method of claim 1, wherein the CE device is attached to a VPLS core.

7. The method of claim 6, wherein the CE device it attached using at least one aggregated link.

8. The method of claim 1, wherein the re-computation includes determining whether the dual homing port not associated with the failure is in the blocking state.

* * * * *